(12) United States Patent
Takaichi et al.

(10) Patent No.: US 9,251,951 B2
(45) Date of Patent: Feb. 2, 2016

(54) METHOD OF MANUFACTURING MAGNET SEGMENT OF FIELD POLE MAGNET BODY

(71) Applicant: NISSAN MOTOR CO., LTD., Kanagawa (JP)

(72) Inventors: Kazuhiro Takaichi, Yokohama (JP); Kimio Nishimura, Yokohama (JP); Hideki Watanabe, Sagamihara (JP); Takashi Sekikawa, Yokohama (JP); Yasushi Matsushita, Yokohama (JP); Akihisa Hori, Yokohama (JP); Takumi Ohshima, Yokohama (JP); Michito Kishi, Atsugi (JP); Kunitomo Ishiguro, Odawara (JP); Yasuhisa Koike, Fujisawa (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 1 day.

(21) Appl. No.: 14/374,951

(22) PCT Filed: Jan. 30, 2013

(86) PCT No.: PCT/JP2013/051999
§ 371 (c)(1),
(2) Date: Jul. 28, 2014

(87) PCT Pub. No.: WO2013/115224
PCT Pub. Date: Aug. 8, 2013

(65) Prior Publication Data
US 2015/0034691 A1 Feb. 5, 2015

(30) Foreign Application Priority Data

Feb. 1, 2012 (JP) .................................. 2012-019634

(51) Int. Cl.
*H01F 41/02* (2006.01)
*H02K 15/03* (2006.01)
*B26F 3/00* (2006.01)
*H02K 1/27* (2006.01)

(52) U.S. Cl.
CPC ............ *H01F 41/0253* (2013.01); *B26F 3/002* (2013.01); *H02K 1/276* (2013.01); *H02K 15/03* (2013.01); *Y10T 225/12* (2015.04)

(58) Field of Classification Search
CPC .... H01F 41/0253; H02K 1/276; H02K 15/03; B26F 3/002; Y10T 225/12
USPC ........................................................ 29/426.2
See application file for complete search history.

(56) References Cited

U.S. PATENT DOCUMENTS 3,564,958 A * 2/1971 Richter .................. B65H 54/71
83/100
4,369,567 A * 1/1983 Bosch .................. B28D 5/0029
225/97

(Continued)

FOREIGN PATENT DOCUMENTS

JP 2009-033958 A 2/2009
JP 2010-259231 A 11/2010

(Continued)

*Primary Examiner* — Sean Michalski
(74) *Attorney, Agent, or Firm* — Young Basile

(57) ABSTRACT

A method of manufacturing a magnet segment of a field pole magnet body includes cleaving a magnet material at a plurality of cleavage target regions arranged with an interval in a longitudinal direction of the magnet material. The cleavage process includes cleaving the magnet material sequentially from the cleavage target region closer to one side edge of the longitudinal direction of the magnet material, wherein a notch is formed in each of the plurality of cleavage target regions of the magnet material such that a depth of the notch closer to the one side edge becomes deeper.

2 Claims, 6 Drawing Sheets

(56) References Cited

U.S. PATENT DOCUMENTS

| | | | | |
|---|---|---|---|---|
| 8,510,933 | B2* | 8/2013 | Murakami | H01F 7/0221 29/417 |
| 8,747,583 | B2* | 6/2014 | Takaichi | H01F 141/0253 156/580 |
| 8,819,921 | B2* | 9/2014 | Adachi | H01F 7/0221 29/417 |
| 2006/0042432 | A1* | 3/2006 | Bottcher | G02B 6/25 83/13 |
| 2010/0244608 | A1* | 9/2010 | Nakamura | H01F 1/08 310/156.38 |
| 2012/0036696 | A1* | 2/2012 | Murakami | H01F 7/0221 29/426.2 |
| 2012/0194025 | A1* | 8/2012 | Fubuki | H01F 7/021 310/156.38 |
| 2013/0057374 | A1* | 3/2013 | Adachi | H01F 7/0221 335/306 |
| 2013/0087265 | A1* | 4/2013 | Takaichi | H01F 41/0253 156/60 |
| 2014/0231483 | A1* | 8/2014 | Takaichi | H02K 15/03 225/1 |
| 2014/0263523 | A1* | 9/2014 | Allyn | B23D 31/002 D31/2 |
| 2015/0158197 | A1* | 6/2015 | Takaichi | H02K 15/03 225/3 |

FOREIGN PATENT DOCUMENTS

| | | |
|---|---|---|
| JP | 2011-125105 A | 6/2011 |
| WO | 2010-038748 A1 | 4/2010 |
| WO | 2011-004490 A1 | 1/2011 |
| WO | 2011-145433 A1 | 11/2011 |

* cited by examiner

//  METHOD OF MANUFACTURING MAGNET SEGMENT OF FIELD POLE MAGNET BODY

CROSS REFERENCE TO RELATED APPLICATION

The present application claims priority to Japanese Patent Application No. 2012-019634, filed Feb. 1, 2012 and is incorporated herein in its entirety.

TECHNICAL FIELD

The present invention relates to a method of manufacturing a magnet segment of a field pole magnet body provided in a permanent magnet rotary electric machine.

BACKGROUND ART

In JP2009-33958A, there is disclosed a technique of manufacturing a field pole magnet body housed in a rotor core of a permanent magnet embedded rotary electric machine by cleaving a plate-shaped magnet material into a plurality of magnet segments and bonding the plurality of magnet segments.

In the field pole magnet body manufactured in this manner, an individual magnet segment has a reduced volume. Accordingly, an eddy current generated from the magnet segment due to a change of the magnetic field caused by rotation of the rotor is reduced. As a result, it is possible to suppress heating of the field pole magnet body caused by generation of the eddy current and prevent irreversible thermal demagnetization.

SUMMARY OF INVENTION

When the magnet material is cleft into three or more magnet segments, it is conceived that the magnet material may be sequentially cleft into magnet segments one by one from one side edge of the magnet material through three-point bending.

However, in this configuration, a size difference is significant between a pair of rough magnet pieces obtained through an initial cleavage (one for the magnet segment and the other for the remaining magnet material). Therefore, a crack is easily transmitted to a smaller rough magnet piece (magnet segment) suffering from a more significant strength loss, and an abnormal crack may be easily generated.

In view of the aforementioned problems, there is a need for a method of manufacturing a magnet segment of a field pole magnet body by which generation of an abnormal crack can be suppressed.

According to an aspect of the invention, there is provided a method of manufacturing a magnet segment of a field pole magnet body by cleaving a magnet material at a plurality of cleavage target regions arranged with an interval in a longitudinal direction of the magnet material.

The method includes a cleavage process of cleaving the magnet material sequentially from the cleavage target region closer to one side edge of the longitudinal direction of the magnet material, wherein a notch is formed in each of the plurality of cleavage target regions of the magnet material such that a depth of the notch closer to the one side edge becomes deeper.

The foregoing and additional features and characteristics of this disclosure will become more apparent from the following detailed description considered with the reference to the accompanying drawings.

DESCRIPTION OF EMBODIMENTS

Figure 1A:
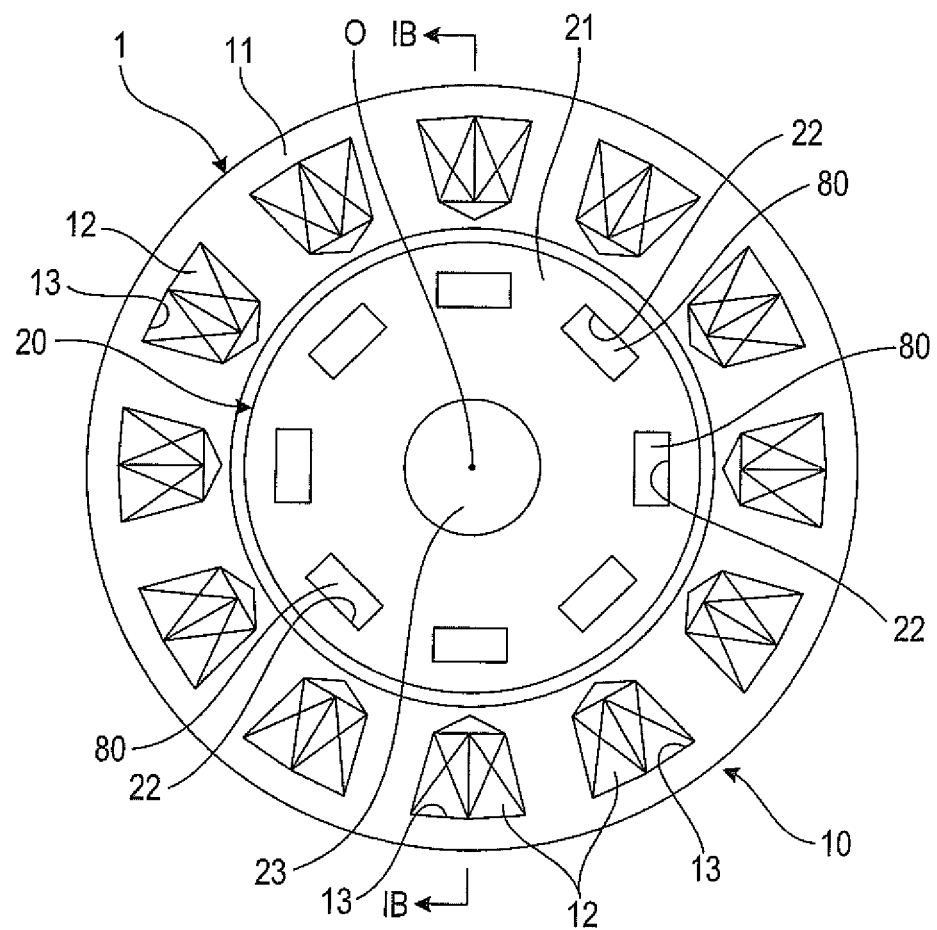
FIG. 1A is a schematic diagram illustrating main components of a permanent magnet type motor.
Figure 1B:
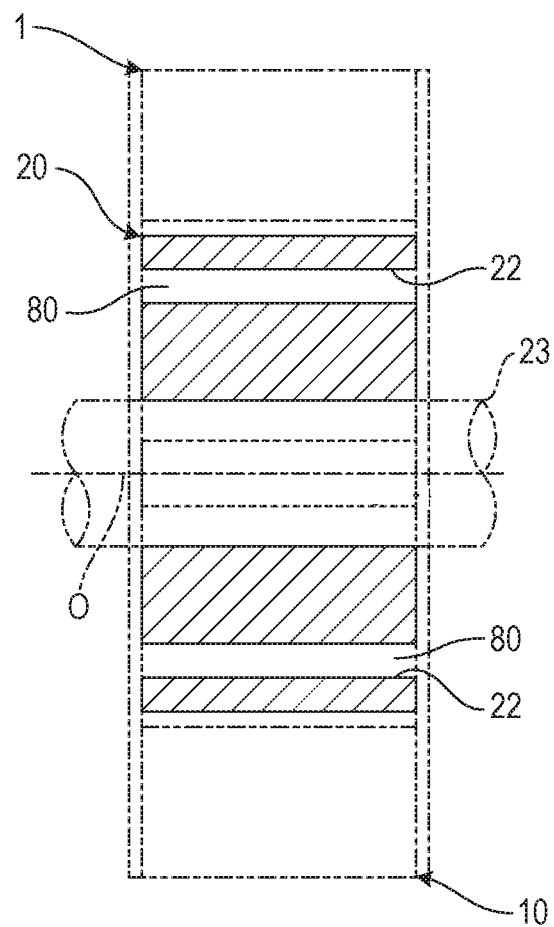
FIG. 1B is a cross-sectional view taken along a line IB-IB of FIG. 1A.

FIGS. 1A and 1B illustrate a permanent magnet embedded rotary electric machine 1. The rotary electric machine 1 includes a ring-like stator 10 serving as a part of a casing and a cylindrical rotor 20 arranged coaxially with the stator 10.

The stator 10 includes a stator core 11 and a plurality of coils 12. A plurality of coils 12 are housed in slots 13 formed in the stator core 11 with the same angle interval along the same circumference centered at the shaft center O.

The rotor 20 includes a rotor core 21, a rotational shaft 23 rotating integratedly with the rotor core 21, and a plurality of field pole magnet bodies 80. A plurality of field pole magnet bodies 80 are housed in slots 22 formed with the same angle interval along the same circumference centered at the shaft center O.

Figure 2:
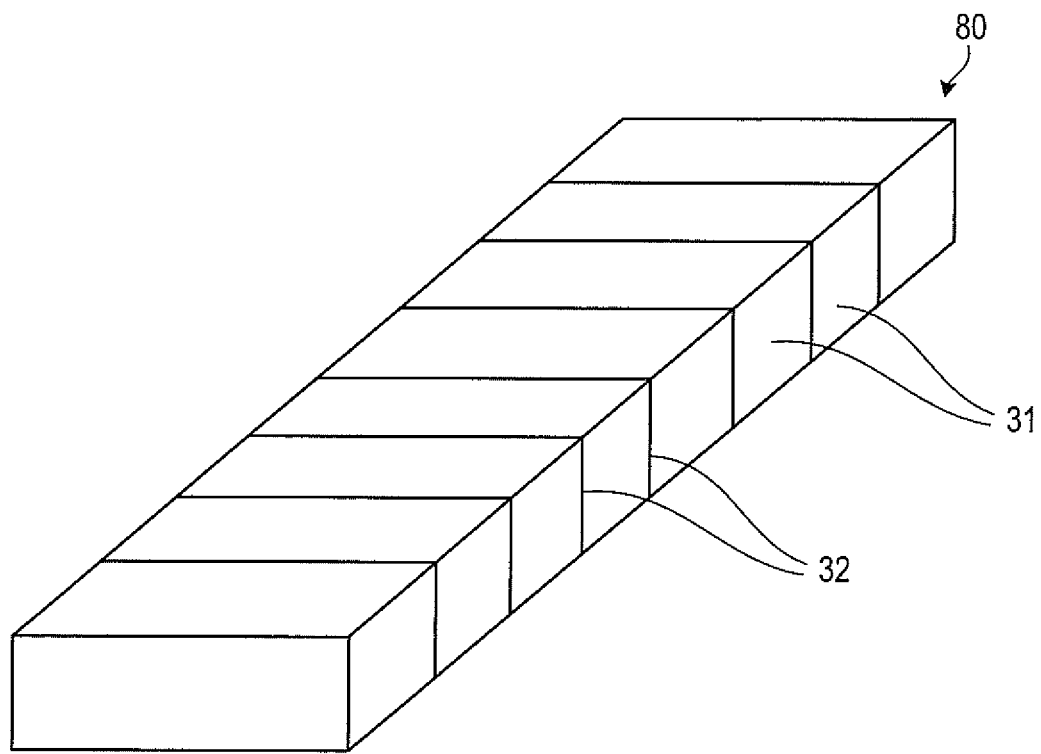
FIG. 2 is a perspective view illustrating a field pole magnet body.

As illustrated in FIG. 2, the field pole magnet body 80 is formed by straightly aligning a plurality of magnet segments 31 formed by cleaving a rectangular magnet material 30 (refer to FIG. 4) and bonding the magnet segments 31 using an epoxy-based thermosetting adhesive 32. In the adhesive 32, glass beads are mixed as a spacer for obtaining a clearance between the neighboring magnet segments 31. At the time of the bonding, a jig is used to apply a spring force to press the magnet segments 31 in a bonding direction. In addition, a spring force is also applied from a direction perpendicular to the bonding direction (from a plurality of directions as necessary) in order to prevent a deviation between the bonding surfaces of the magnet segments 31.

In the field pole magnet body 80 formed in this manner, the neighboring magnet segments 31 are electrically insulated from each other. In addition, the eddy current generated in the magnet segment 31 due to a change of the applied magnetic field is reduced by maintaining the eddy current to stay in the individual magnet segment 31. As a result, it is possible to suppress heating of the field pole magnet body 80 caused by the eddy current and prevent irreversible thermal demagnetization.

In addition, instead of the epoxy-based thermosetting adhesive 32, other adhesives such as a UV-curing adhesive or a dual-liquid room temperature curing type adhesive may be employed as the adhesive 32. In addition, instead of the glass beads, resin beads, insulating cloth or the like may be employed as the spacer.

Next, a description will be made for a process of forming the magnet segment 31 by cleaving the magnet material 30 with reference to FIG. 3 and subsequent drawings.

Figure 3:
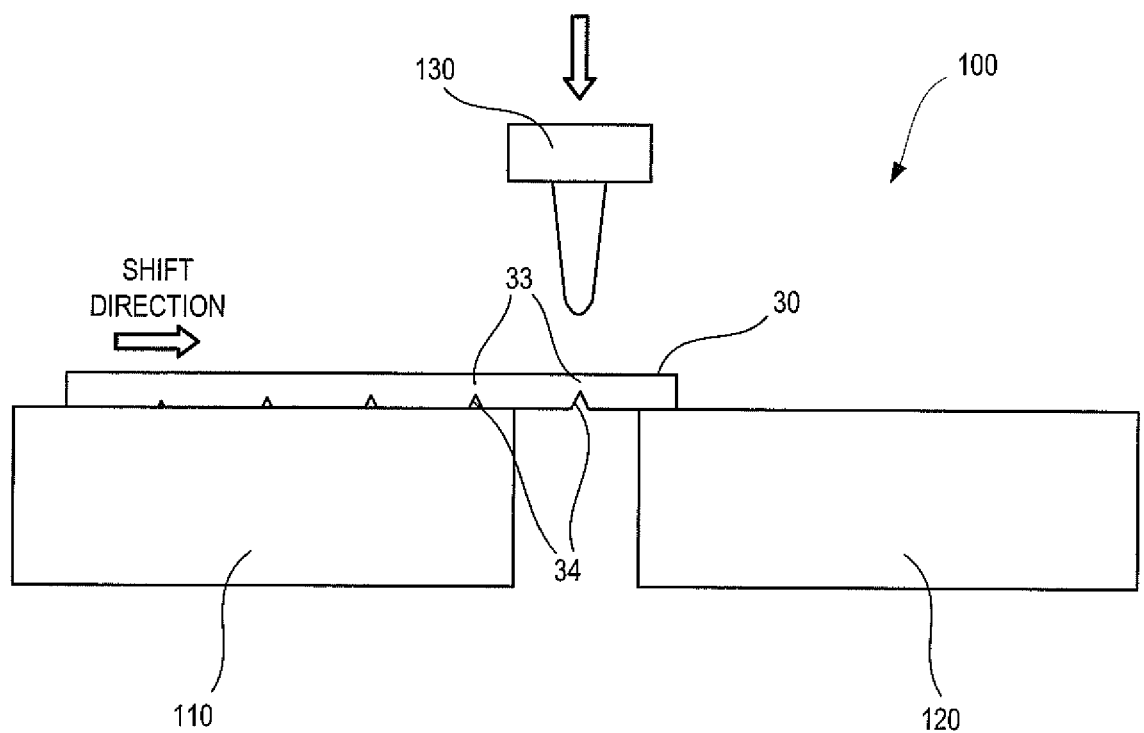
FIG. 3 is a schematic diagram illustrating a device used to form a magnet segment by cleaving the magnet material.

FIG. 3 illustrates a schematic configuration of a device 100 used to form the magnet segment 31 by cleaving the magnet material 30.

The device 100 includes left and right tables 110 and 120 arranged with a gap and a punch 130 arranged over that gap formed between the left and right tables 110 and 120.

The punch 130 has a lower tip having a wedge shape and is movable up and down by a power source (not illustrated). As the power source, various press machines such as a servo press machine, a mechanical press machine, and a hydraulic press machine may be employed.

The magnet material 30 is a rectangular shape extending in a left-and-right direction in the drawings. The magnet material 30 has a plurality of cleavage target regions 33 with an interval along its longitudinal direction, and fragile regions having notches 34 are formed in the lower sides of the cleavage target regions 33. The notches 34 will be described in detail below.

As the magnet material 30 is placed on the left table 110 and is shifted in the right direction of the drawings using a shift mechanism (not illustrated), the right edge of the magnet material 30 is placed on the right table 120, and the cleavage target region 33 of the rightmost side is placed on the gap between the left and right tables 110 and 120 (as illustrated in FIG. 3).

As the punch 130 is lowered in this state, a force is applied to the cleavage target region 33 arranged in the rightmost side from the punch 130, the left table 110, and the right table 120, so that the cleavage target region 33 is cleft by virtue of three-point bending.

Figure 4:
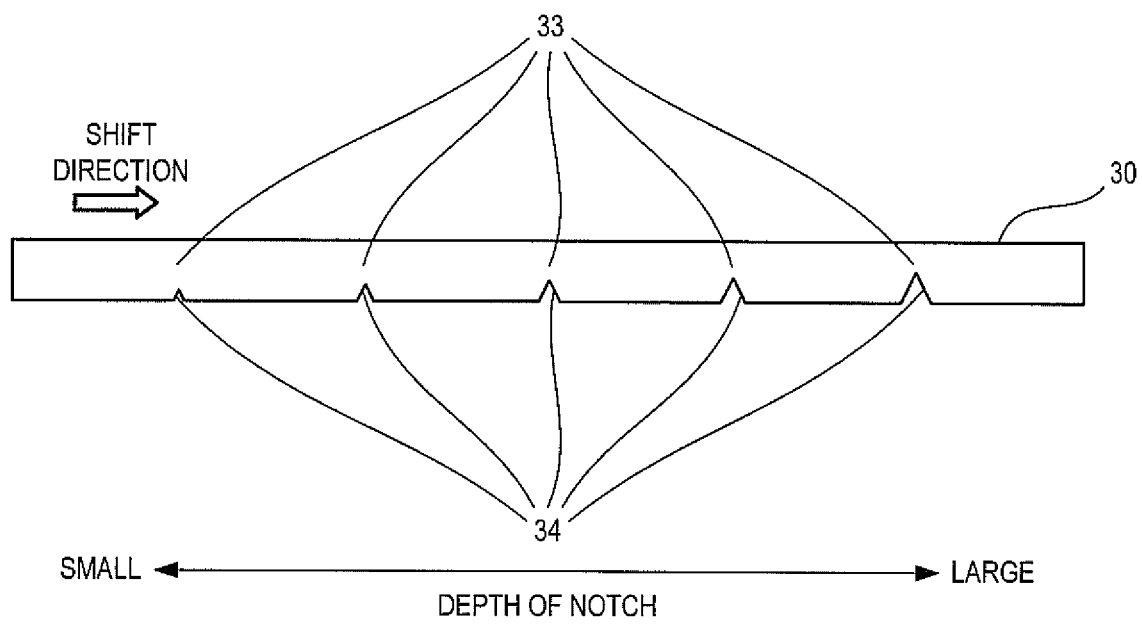
FIG. 4 is a diagram for describing a notch formed on the magnet material.

FIG. 4 illustrates the magnet material 30. Notches 34 are formed on a plurality of cleavage target regions 33 of the magnet material 30 through laser machining. The notches 34 are formed such that the one formed in the cleavage target region 33 closer to the right edge becomes deeper.

If the notches 34 have the depths in this manner, the cleavage target region 33 closer to the right edge of the magnet material 30 has a lower strength and is more easily cleft. Therefore, it is possible to prevent an abnormal crack of the magnet material 30 although the rough magnet pieces obtained through the cleavage have a different size between the left and right sides in an initial stage of the cleavage of the magnet material 30.

Since a possibility of an abnormal crack caused by a fact that the rough magnet piece has a different size as the cleavage position is apart from the right edge is lowered, there is no problem even when the depth of the notch 34 is reduced as the notch 34 becomes apart from the right edge. Instead, compared to a case where the notches having the same depth as that of the notch 34 formed in the cleavage target region 33 closest to the right edge are formed in all of the cleavage target regions 33, it is possible to reduce the amount of the magnet lost in the machining of the notches 34 and suppress reduction of the magnetic force of the magnet.

It is possible to perform the cleavage sequentially from the cleavage target region 33 closer to one side edge regardless of a size difference between the left and right rough magnet pieces obtained through the cleavage. Therefore, it is not necessary to alternately shift the magnet material 30 to the left and the right in order to match the left and right lengths of the rough magnet pieces obtained through the cleavage. As a result, it is possible to reduce a cycle time.

It is noted that, although it is assumed here that the notch 34 is formed through laser machining, the notch 34 may be formed through a mechanical method using a slicer or the like or other methods such as a wire-cut electric discharge machining.

Figure 5:
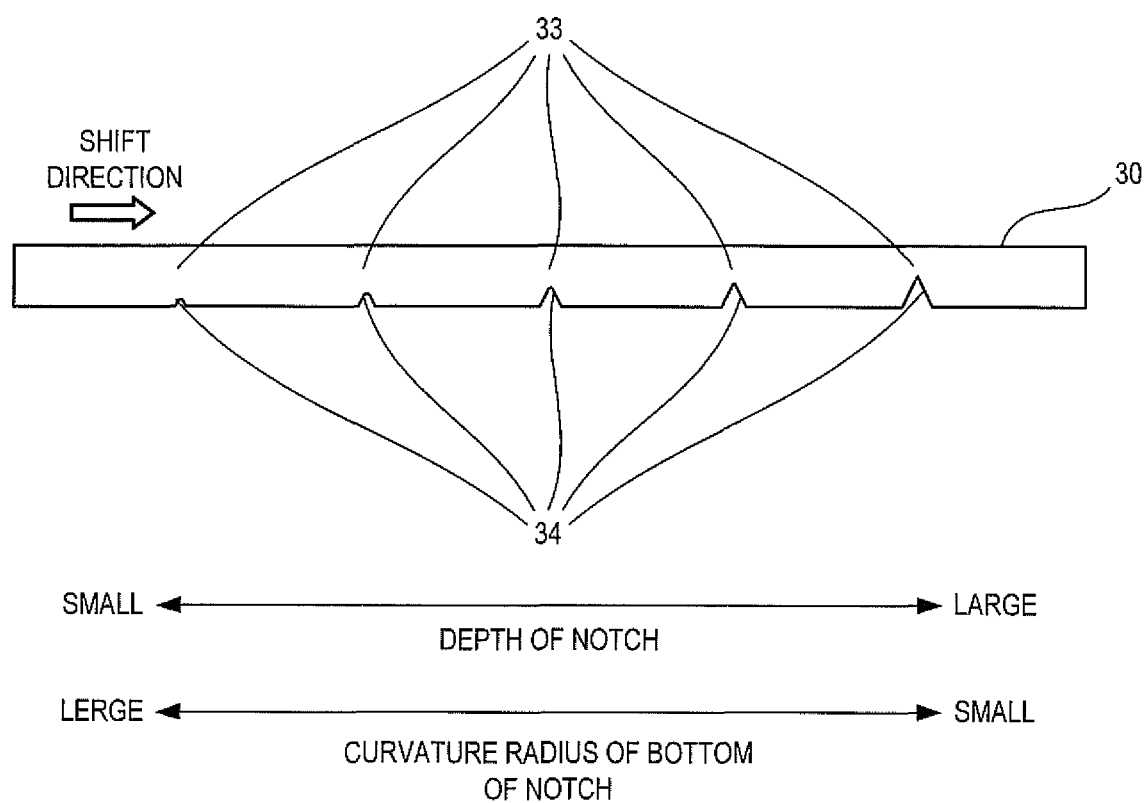
FIG. 5 is a diagram for describing a modification of the notch formed on the magnet material.

FIG. 5 illustrates a partial modification of the notch 34 formed in the magnet material 30.

Similar to FIG. 4, the depth of the notch 34 formed in the cleavage target region 33 closer to the right edge is deeper. However, in this modification, the curvature radius of the bottom of the notch 34 formed in the cleavage target region 33 closer to the right edge is smaller. That is, the cutting depth is more acute.

As a result, a stress concentration on the bottom of the notch 34 generated when the punch 130 is pressed onto the magnet material 30 increases in the cleavage target region 33 closer to the right edge of the magnet material 30. Therefore, it is possible to more easily perform cleavage.

For this reason, if the notches 34 are formed as illustrated in FIG. 5, it is possible to more effectively suppress an abnormal crack. In addition, considering a fact that the machining of each notch 34 is performed by changing a tool due to a difference of the curvature radius of the bottom of the notch, it is possible to reduce a burden of the tool used to perform the machining of the notch 34 having a small curvature radius and suppress wearing thereof.

Although various embodiments of this disclosure have been described hereinbefore, they are just for illustrative purposes and are not intended to specifically limit the technical scope of the invention. Instead, it is noted that various changes or modifications may be possible without departing from the spirit and scope of the invention.

For example, although the depths of the notches 34 are different in the aforementioned embodiment, some of the neighboring notches 34 may have the same depth if the notches 34 are formed such that the depth of the notch 34 closer to one side edge becomes deeper as a whole. For example, several notches 34 from one side edge may have the same depth, and the remaining notches 34 may have a depth shallower than that. It is noted that such a configuration is expressed in a phrase of the appended claims: "a notch is formed in each of the plurality of cleavage target regions such that a depth of the notch closer to the one side edge in a longitudinal direction of the magnet material becomes deeper."

Similarly, although the curvature radius of the bottom is different between all the notches 34 in the aforementioned embodiment, the curvature radius of the bottoms of the neighboring notches 34 may be same if the notches 34 are formed such that the curvature radius of the bottom of the notch closer to the one side edge becomes smaller as a whole. For example, several notches 34 from the one side edge may have the same curvature radius of the bottom of the notch, and the remaining notches 34 may have a curvature radius of the bottom of the notch larger than that. It is noted that such a configuration is expressed in a phrase of the appended claims: "the notches are formed such that a curvature radius of a bottom of the notch closer to one side edge of the longitudinal direction of the magnet material is smaller."

The invention claimed is:

1. A method of manufacturing a magnet segment of a field pole magnet body, the method comprising:
    cleaving a magnet material at a plurality of cleavage target regions arranged with an interval in a longitudinal direction of the magnet material, wherein
        the magnet material is sequentially cleaved from the cleavage target region closer to one side edge of the longitudinal direction of the magnet material; and
    forming a notch in each of the plurality of cleavage target regions of the magnet material such that a depth of the notch closer to the one side edge becomes deeper.

2. The method of claim 1, wherein the notches are formed such that a curvature radius of a bottom of the notch closer to one side edge of the longitudinal direction of the magnet material is smaller.

* * * * *